United States Patent [19]

Le Roch et al.

[11] 3,758,728

[45] Sept. 11, 1973

[54] REPEATER FAULT LOCALIZATION SYSTEM

[75] Inventors: Emile Francois Louis Le Roch, Velizy; Robert Troncy, Antony, both of France

[73] Assignee: Telecommunications Radioelectriques et Telephoniques T. R. T., Paris, France

[22] Filed: June 22, 1972

[21] Appl. No.: 265,331

[30] Foreign Application Priority Data

June 24, 1971 France .............................. 7122982

[52] U.S. Cl. .......................................... 179/175.31 R

[51] Int. Cl. .......................................... H04b 3/46

[58] Field of Search ................. 179/175.31 R, 175.3

[56] References Cited

UNITED STATES PATENTS

| | | | |
|---|---|---|---|
| 3,651,284 | 3/1972 | Maione | 179/175.31 R |
| 3,560,670 | 2/1971 | Heyes | 179/175.31 R |
| 3,392,242 | 7/1968 | Smith et al. | 179/175.31 R |
| 3,054,865 | 9/1962 | Holloway et al. | 179/175.31 R |

*Primary Examiner*—Kathleen H. Claffy
*Assistant Examiner*—Douglas W. Olms
*Attorney*—Frank R. Trifari

[57] ABSTRACT

A repeater fault localization system for line repeaters which are distributed in attelecommunication network and are fed by a remote supply source which is arranged in the initial station. This station includes a transmitter for feedback command signals, which transmitter consists of an inverter for the remote supply voltage and in which a receiver for feedback command signals is arranged in each amplifier, which receiver consists of a relay for feeding back the line repeaters, the relay being connected to a store which is excited when the voltage pulses are applied with the reversed polarity to the line repeaters in order that contacts of the relay switch off the supply line behind a fed-back line repeater.

Use: localization of faulty line repeaters.

6 Claims, 2 Drawing Figures

REPEATER FAULT LOCALIZATION SYSTEM

Figure 1:
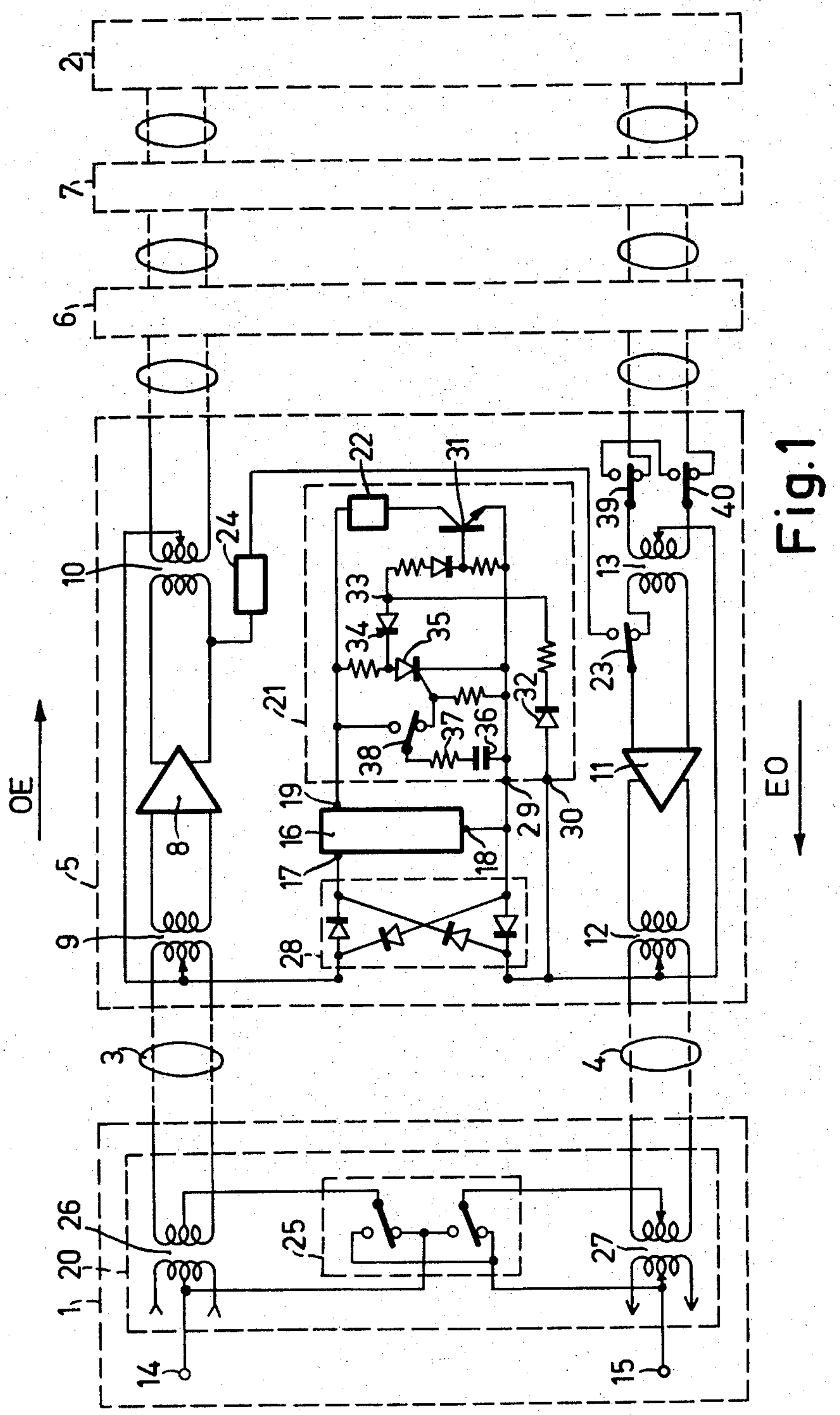

The invention relates to a system for localizing faulty line repeaters present in repeater stations which are located at mutual distances in a transmission path connecting two terminal stations, each repeater station comprising a first line repeater in the West-East line and a second line repeater in the East-West line, said line repeaters being fed from a remote supply line connected to a direct voltage supply source in one of said terminal stations, each repeater station comprising a relay which in the operatice condition closes a link connecting the output of said first line repeater to the input of said second line repeater, and receiving means for operating said relay to close said link in response to a command signal transmitted by a transmitter in one of said terminal stations.

Such a system makes it possible to localize faulty line repeaters, since link the West-East line to the East West line at any one of the repeater stations so as to thereby test at a terminal station all repeaters in the loop thus formed.

In the known systems for localizing a faulty line repeater, the line repeaters are generally characterized by mutually different frequencies or codes which gives rise to complicated and expensive arrangements for the transmitters and the receivers for the command signals. In addition the line repeaters are not completely identical because each one of the receiver circuits must be adjusted to receive exclusively its own frequency or code. Moreover, the known systems frequently require the use of a special line for the transmission of the command signals between the initial station and the line repeaters.

An object of the invention is to provide a reliable and at the same time more simple fault localisation system.

Another object is to provide a system in which the transmitter for the command signals is less complicated.

Still another object is to provide a system in which the receivers for the command signals are all identical and in which no special line is required for the transmission of the command signals.

According to the invention a system for localizing faulty means repeater is characterized in that the transmitter for the command signals comprises a polarity reversal switch arranged in series with the remote supply line, said switch having a first position in which the supply voltage is applied with the normal polarity to said supply line and a second position in which the supply voltage is applied to said supply line with the reversed polarity, and in that the receiving means in each repeater station is connected to the remote supply line to operate said relay in response to the supply voltage of reverse polarity, and means including a memory in each repeater station for preventing said relay from being operated once it has assumed its normal rest position after first having been operated by said supply voltage of reverse polarity, said relay further comprising contacts which in the operative condition of the relay prevent the supply voltage of reverse polarity from being applied to the repeater stations beyond the one in which the relay is in the operative condition.

Figure 2:
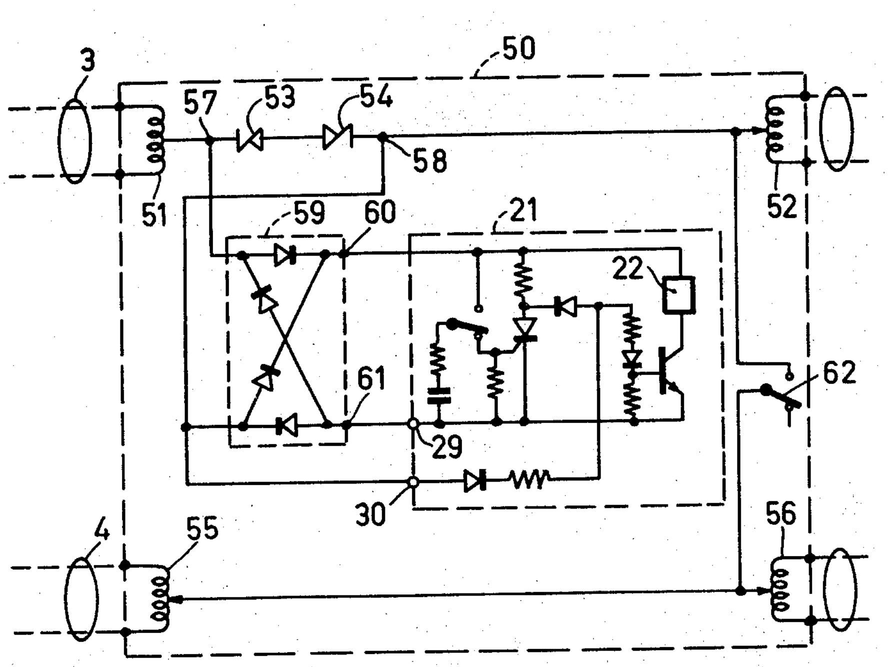

In order that the invention may be readily carried into effect, two embodiments thereof will now be described in detail by way of example with reference to the accompanying diagrammatic drawings, in which, FIGS. 1 and 2 show embodiments of a fault localisation system according to the invention in which the supply circuit for each line repeater is connected in parallel with the remote supply line (FIG. 1) and in which the supply circuit is connected in series with the remote supply line (FIG. 2).

Referring to FIG. 1 there is shown a system the station which comprises a first terminal station or central station 1 and a second terminal station or subscriber station 2. Transmission is effected in the West-East direction through pair 3 from station 1 to station 2, and in the East West direction through pair 4 from station 2 to station 1.

Identical line repeaters such as, for example, 5, 6 and 7 are incorporated in the telecommunication line between 1 and 2. Only the first receiver 5 is shown, which includes at one end the repeater 8 which is used for the West-East transmission direction and which is included in pair 3 through transformers 9 and 10 and at the other end it includes the repeater 11 which is used for transmission in the East-West direction and is included in pair 4 by means of transformers 12 and 13. The line repeaters are fed by means of a remote supply line which is connected in station 1 to a direct voltage source including terminals 14 and 15. In the case of FIG. 1 the remote supply line is constituted by the phantom circuit which is formed with the aid of the two pairs of transmission lines 3 and 4 and the supply arrangement for the line repeaters such as, for example, 16 for the line repeater 5 at the input terminals 17 and 18 which are connected in parallel with the remote supply line (that is to say, in this case connected to the central taps of transformers 9 and 12). The supply circuit 16 provides the stabilised voltage required for feeding the two repeaters 8 and 11 of the line repeater station between terminals 19 and 18 (in which 18 is the terminal having zero potential). To simplify the circuit diagram the connections for the supply of the two repeaters are not shown. A supply circuit for the line repeater, such as 16, which is connected in parallel with the remote supply line, is described in French patent application in the name of the Applicant dated Apr. 15, 1971, No. 7113280.

A transmitter for command signals 20 is incorporated in station 1 and each line repeater includes a receiver circuit 21 for the command signals, which circuit is fed by the supply circuit 16 and which controls a relay 22. When this relay is in its operative condition it closes a link connecting the output of the repeater 8 which is used in the West-East direction to the input of the repeater 11 which is used in the East-West direction. In FIG. 1 the relay 22 is shown in the operative condition and the link between the line repeaters 8 and 11 is closed by the work contact 23 of the relay through a dummy load 24 which ensures normal operation of the line repeaters 8 and 11.

When the link in a given repeater station is closed the section of the line between the terminal station 1 and this repeater station may be tested; when the other line repeaters of this section are known to operate satisfactorily, it is actually the linked line repeaters which are being tested. Since the links in the repeater stations may be temporarily closed in succession, so that ultimately the last line repeater station is tested it is readily evident that a defective line repeater in the transmission path can be localized.

The localisation system according to the invention has the advantage that the receiving circuits for the command signal in the subsequent repeater stations are all identical and need not be individually adjusted. All line repeaters are equal and are controlled by means of the remote supply line from the initial station, that is to say, by means of the phantom circuit of the two pairs 3 and 4 in case of FIG. 1.

According to the invention the command signal transmitter 20 comprises a polarity reversal switch 25 which is arranged in series with the remote supply line in a manner such that dependent on the position of the switch 25 the supply voltage is applied with normal or with reverse polarity. In the present case in which the supply line is the phantom circuit for the two transmission line pairs, the switch 25 is arranged between the central taps of the transformers 26 and 27 and pairs 3 and 4. The normal polarity of the supply voltage is the one for which the line repeaters receiving a voltage of such a polarity operate normally, that is to say, there is no repeater station in which the repeaters are linked. In FIG. 1 the normal polarity of the supply voltage is, for example, the one for which a positive voltage is present at pair 3 and a negative voltage is present at pair 4. The reverse polarity is the one for which negative voltage is present at pair 3 and positive voltage is present at pair 4.

FIG. 1 shows that for supplying each line repeater irrespective of the polarity of the supply voltage of the supply line, the supply voltage stabilisation circuit 16 is connected to this line through a bridge circuit constituted by diodes 28 in a manner such that the input terminals 17 and 18 of the circuit 16 always receive a voltage of the same polarity; (+) at 17 and (−) at 18.

The receiver 21 for the command signals is connected to the supply line in a manner such that it applies a command signal to the relay 22 when the voltage is applied with reversed polarity.

The embodiment of FIG. 1 shows that an input terminal 29 of the receiver 21 is connected to the terminal 18 of the supply circuit 16 which due to the diode bridge circuit 28 always has the negative polarity. The other input terminal 30 is connected to the line pair 4 which, as can be seen, has negative-polarity when the supply voltage is applied with normal polarity to the line and which has positive polarity whenever the supply voltage has the reversed polarity.

In receiver 21 the terminal 29 is connected to the emitter of the npn transistor 31 and terminal 30 is connected through diode 32 to point 33 which is connected to the control circuit of the base of transistor 31. Diode 34, which is oppositely poled with respect to diode 32, is also connected to point 33. The blocking or conducting state of diode 34 is determined by the position of a thyratron 35.

The control electrode of thyratron 35 is connected through the rest contact 38 of relay 22 to the series circuit of a capacitor 36 and a resistor 37.

It can be seen that when the remote supply voltage after having been interrupted is reestablished with the normal polarity (i.e. (+) at pair 3 and (−) pair 4), transistor 31 is cut off because the diode 30 is blocked and relay 22 is in its normal inoperative condition, while further thyratron 35 is not conducting because no positive voltage is applied to its control electrode since capacitor 36 is discharged. Diode 34 is thus blocked. The line repeater station is then in its normal working condition. There is no link closed and the rest contact 23 of relay 22 renders it possible to transmit through pair 4 in the East-West direction.

When a line repeater such as, for example, 5 receives a voltage of reversed polarity in accordance with the polarity (+) at the input 30 of the receiver 21, diode 30 becomes conducting while transistor 31 becomes conducting and relay 22 assumes its operative condition, provided thyristor 35 is non-conducting and thus diode 34 is blocked.

When starting from the above-mentioned situation in which the supply voltage after having been interrupted is re-established and applied to the line repeater 5 with normal polarity the result is that when the voltage is again applied with reversed polarity, thyristor 35 is not conducting and relay 22 is actually in its operative condition. The line repeaters 8 and 11 are linked through the work contact 23. Simultaneously capacitor 36 is charged to the positive voltage through the work contact 38, which positive voltage is applied to the terminal 19 from supply voltage stabilisation circuit 16.

When the supply voltage of normal polarity is again applied to the supply line and is received by line repeater 5, transistor 31 is cut off and relay 22 assumes its normal inoperative condition. Moreover, capacitor 36 is discharged via the rest contact 38 and through the control circuit of thyristor 35. This thyristor becomes conducting and will remain conducting as long as the voltage on the remote supply line is not interrupted. The command signals which can now be produced in the form of voltage pulses of reverse polarity applied to the remote supply line have no effect on relay 22 which will remain in its inoperative condition as long as thyristor 35 remains conducting. These pulses pass through the circuit which is constituted by the diodes 30 and 34 and the conducting thyristor 35 whose cathode has the same potential as the emitter of transistor 31. Point 33 has no sufficient potential to render transistor 31 conducting and relay 22 remains in the inoperative condition.

It is evident that thyristor 35 is a memory which is activated when the relay 22 returns to its inoperative condition. When this memory is active it temporarily prevents the relay 22 from being operated by the supply voltage of reverse polarity. Due to this memory the relay which is brought once to the operative state by applying a voltage of reversed polarity to the supply line will no longer return to the operative state when subsequently the voltage of the normal and the voltage of the reversed polarity is alternately applied to the line. It is of course possible to use completely different memories such as relays, trigger circuits, etc.

FIG. 1 shows that the rest contacts 39 and 40 of relay 22 are connected in series with each of the lines of pair 4 so that if relay 22 is in the operative condition the supply voltage will not be applied to the line repeaters further down the line i.e. the line repeaters 6 and 7 in case of FIG. 1.

All line repeaters of the connection are equal and have the same receiver circuit for the command signals as described above for line repeater 5. According to the condition of this receiver circuit the line repeaters thus have the three possible states in accordance with the description above:

the normal state which is characterized by the inoperative condition of the relay and the non-activated memory. This state is obtained either by interrupting the supply voltage, or by re-establishing this supply voltage with normal polarity, after it was interrupted.

the looped-state, i.e. the state in which the link is closed and which state is characterized by the operative condition of the relay and the non-activated condition of the memory. This state is obtained when the line repeater which is initially in the normal state receives the supply voltage of reverse polarity.

The non-reactive state which is characterized by the inoperative condition of the relay and the activated condition of the memory. This state is obtained when the line repeater which is initially in the looped state receives the supply voltage of normal polarity. When a line repeater is in this state, it is insensitive to command signals applied thereto, but it passes these command signals to line repeaters further down the line.

In order that a line repeater which is in the non-reactive state return to its normal state, the voltage at the supply line is interrupted for some time, so as to render the memory inactive (the blocked condition of thyristor 35).

The above-mentioned localisation system is used in the following manner for localizing faulty line repeaters in a defective connection including, for example, three repeaters 5, 6 and 7 and according to FIG. 1.

It is assumed that all line repeaters are initially in their normal state. To this end the supply voltage, which is applied from station 1 through the phantom circuit to the pairs 3 and 4 (supply line), must first be interrupted temporarily, for example, several seconds, which interruption is followed by a renewed operation at the normal polarity.

For localizing the line repeater 1, the voltage of reversed polarity is applied to the supply line through switch 25, which involves a first reversal of the polarity of the supply voltage. The receiving circuits in all line repeater stations instantaneously receive this voltage, but this voltage is maintained at the first line repeater station 5 only, since the supply voltage is interrupted for all stations beyond the first one, in which the relay in its operative condition interrupts the passage of the supply voltage to the stations further down the line. The line repeaters 6 and 7 therefore remain in the normal state due to the absence of the supply voltage. Thus, when a test signal is applied to pair 3, the line repeater 5 can be tested. At the end of this test, the voltage of normal polarity is applied to the supply line, which involves a second polarity reversal. The line repeater 5 is thereby brought to its non-reactive state.

In order to test the line repeater 6, i.e. the second line repeater of the connection, the supply voltage is applied with reversed polarity (third reversal of the polarity). Line repeater 5 remains in the non-reactive state and line repeater station 6 assumes the looped state, in which line repeater 7 does not receive the supply voltage. Line repeater 6 can thus be tested. At the end of this test the voltage of the normal polarity is applied to the line (fourth reversal of the polarity) and line repeater 6 assumes its non-reactive state. For line repeater 5, which remains in its non-reactive state, nothing has changed.

Line repeater station 7, i.e. the third line repeater station in the connection, can be tested in that the voltage of reverse polarity is applied to the line (fifth reversal of the polarity). When subsequently the voltage of the normal polarity is applied, line repeater station 7 is brought to the non-reactive state.

It will be evident that in this manner a connection having an arbitrary number of line repeaters can be tested. It is sufficient to count the number of polarity reversals and this through the polarity reversal switch 25 so as to determine the number of the line repeater station actually tested, which number is counted from the initial station. When the test shows that a defect occurs at the $(2n-1)^{th}$ reversal of the polarity, it is the line repeater having the number $n$ which is defective.

It is interesting to point out that the localisation system as described above may be used for other purposes than localising a defective line repeater in a defective line between the two stations 1 and 2. Likewise it may be used, when this connection is in a faultness condition, for transmitting from station 1 remote control command signals to the station 2 so as to control, for example, an arrangement for testing the station 2 or subscriber lines. When the phantom circuit is used as a remote supply line for the line repeater this phantom circuit is not interrupted after the last line repeater in the connection but is looped back in the station 2.

When the last line repeater of the connection is brought to the non-reactive state after a given corresponding number of polarity reversals, the following reversals of the polarity which can be effected from station 1, are transferred by the phantom circuit to the station 2. The polarity reversals at station 2 may therefore be utilized as control command signals of an automatic testing arrangement for testing in this station 2, for example, the subscriber lines connected thereto. To utilize this possibility of remote control, when station 2 is remotely supplied, a bridge circuit of diodes may be provided at the input of the supply circuit such as, for example, the diode bridge circuit 28 used at the input of the supply circuit 16 for the line repeaters. When the station 2 is fed locally, the polarity reversals are transferred without special steps through the phantom circuit which is used as a remote supply line for the line repeaters.

The system for localising faults in line repeaters according to the invention may likewise be used when the supply arrangement for each line repeater is arranged in series with the remote supply line instead of in parallel with the remote supply line as is shown in FIG. 1. The supply arrangement for each line repeater is constituted in this case in the manner known for a Zener diode circuit which is connected in series with a cable of the supply line and which provides the control voltage required for feeding the repeater.

In this case the transmitter of the command signals which is arranged in the terminal station is also a polarity reversal switch which applies a voltage of normal or reverse polarity to the remote supply line.

FIG. 2 shows a line repeater which is arranged in series with a supply arrangement and which is provided with a receiver for command signals for the localisation system.

This line repeater 50 is connected between the two transmission pairs 3 and 4. The line repeater is remotely fed by the phantom circuit, which circuit is constituted by the two transmission pairs. For simplifying the Figure the repeaters and the windings on the transformers which are connected to the input or the output of this repeater are not shown. Only the windings of the transformers are shown which have central taps connected to the line repeater so as to constitute the phantom circuit which is used as a remote supply line.

The central taps on the windings 51 and 52 are connected by means of the series arrangement of two oppositely poled Zener diodes 53 and 54. The central taps on the windings 55 and 56 are directly connected. Both Zener diodes 52 and 53 have identic characteristic curves and irrespective of the polarity of the voltage applied to the phantom circuit a voltage having a substantially constant amplitude is obtained at the terminals 56 and 58 of the series arrangement of the two diodes, but the polarity is dependent on the polarity of the voltage applied to the phantom circuit.

To ensure that the remote supply voltage for the line repeater has always the same polarity a diode bridge circuit 59 is connected to the terminals 57 and 58. In this manner a voltage of positive polarity at the terminal 60 and of negative polarity at the terminal 61 is obtained with the direction of the tap on the diodes of the bridge circuit shown in the Figure between the output terminals 60 and 61 of the bridge circuit constituted by the diode. This voltage is used for feeding the repeaters not shown of the line repeater and the receiver for the command signals.

This receiver for the command signals 21 corresponds to the receiver shown in FIG. 1. One of the input terminals 29 is connected to the output terminal 61 of the bridge circuit, while the polarity is not changed, and the input terminal 30 is connected to a cable in the supply line of the terminal 58 while the polarity at each reversal of the polarity of the voltage applied to the phantom circuit changes. The receiver 21 controls relay 22.

The method of operation of the receiver 21 and the relay 22 corresponds to the method as described with reference to FIG. 1 and the corresponding line repeater may assume, as stated, the normal state, the looped state or the non-reactive state dependent on the number of polarity reversals of the supply voltage.

In the case of FIG. 2 in which the supply circuit for the line repeaters is connected in series with the supply line, the supply line is short-circuited directly behind the looped-back line repeater so as to impress the supply voltage on the line repeaters which are located behind a looped back repeater, instead of cutting off the supply lines after this repeater. This is effected by the work contact 62 of relay 22 which for the purpose of short-circuiting the phantom circuit is located between the central taps on windings 52 and 56.

What is claimed is:

1. A system for localizing faulty line repeaters present in repeater stations which are located at mutual distances in a transmission path connecting two terminal stations, each repeater station comprising a first line repeater in the West-East line and a second line repeater in the East-West line of the transmission path, said line repeaters being remotely fed from a remote supply line connected to a direct voltage supply source in one of said terminal stations, each repeater station comprising a relay including first relay contacts which in the operative condition of said relay close a link connecting the output of said first line repeater to the input of said second line repeater, and receiving means for operating said relay in response to a command signal transmitted by a transmitter in one of said terminal stations, characterized in that said transmitter comprises a polarity reversal switch arranged in series with the remote supply line, said polarity reversal switch having a first position in which the supply voltage is applied with the normal polarity to said supply line and a second position in which the supply voltage is applied with reversed polarity to said line, and in that the receiving means in each repeater station is connected to the remote supply line to operate the relay in response to the supply voltage of reversed polarity, and means including a memory in each repeater station for preventing said relay from being operated once it has assumed its normal rest position after first having been operated by said supply voltage of reversed polarity, said relay further comprising second relay contacts which in the operative condition of the relay prevent the supply voltage of reversed polarity from being applied to the repeater stations beyond the one in which the relay is in the operative condition.

2. A system as claimed in claim 1, characterized in that the supply line consists of the phantom circuit which is constituted by two transmission pairs of the connection.

3. A system as claimed in claim 1, characterized in that the supply voltage of each line repeater and particularly of the receiving means for receiving the command signals is provided by a supply voltage stabilization circuit which is arranged in parallel with the supply line through a diode bridge circuit.

4. A system as claimed in claim 1, characterized in that the supply voltage for each repeater and particularly for the receiver of the feedback command signals is provided by a supply voltage stabilization circuit which is arranged in series with the supply line, said circuit including a series arrangement of two oppositely poled Zener diodes, while a bridge circuit of diodes is connected to the terminals of said circuit arrangement, which circuit provides the supply voltage for the line repeater.

5. A system as claimed in claim 1, characterized in that in the receiving means for the command signals the winding of the relay is connected to the output electrode of a transistor whose base control circuit is connected at one end to a cable of the supply line through a first diode which is arranged in such a manner that the relay can be excited when the supply voltage is applied with reversed polarity to the line repeater, while the said base control circuit is connected at the other end to the anode of a thyristor which constitutes the said memory and this through a second diode which is oppositely poled with respect to the base control circuit and the first diode, the control electrode of the transistor being connected to a capacitor through a rest contact of the relay said capacitor being also connected to the supply voltage stabilisation circuit which feeds the line repeater through a work contact of the relay.

6. A test system for the terminal station and the subscriber lines which are connected to said station, characterized in that for transmitting test command signals from the initial station the system includes a localizing system as claimed claim 1, which test command signals are formed by polarity reversals by means of a polarity reversal switch at the supply line after all line repeaters of the connection are brought to the non-reactive state.

* * * * *